US009004059B2

(12) United States Patent (10) Patent No.: US 9,004,059 B2
Sesock et al. (45) Date of Patent: Apr. 14, 2015

(54) REUSABLE HEATER IN A PACKAGE

(75) Inventors: Charles Edward Sesock, College Station, TX (US); Lawrence A. Tinker, College Station, TX (US)

(73) Assignee: Rechargeable Battery Corporation, College Station, TX (US)

( * ) Notice: Subject to any disclaimer, the term of this patent is extended or adjusted under 35 U.S.C. 154(b) by 1125 days.

(21) Appl. No.: 12/874,338

(22) Filed: Sep. 2, 2010

(65) Prior Publication Data

US 2010/0326418 A1  Dec. 30, 2010

Related U.S. Application Data

(63) Continuation-in-part of application No. 12/376,927, filed as application No. PCT/US2007/075740 on Aug. 10, 2007.

(60) Provisional application No. 61/354,004, filed on Jun. 11, 2010, provisional application No. 60/837,029, filed on Aug. 10, 2006.

(51) Int. Cl.
*F24J 1/00* (2006.01)
*A47J 36/28* (2006.01)

(52) U.S. Cl.
CPC ... *F24J 1/00* (2013.01); *A47J 36/28* (2013.01)

(58) Field of Classification Search
USPC .................................. 126/263.02, 204, 263.01
See application file for complete search history.

(56) References Cited

U.S. PATENT DOCUMENTS

| 3,863,648 | A | * | 2/1975 | Cathey | 131/186 |
| 4,366,804 | A | * | 1/1983 | Abe | 126/263.02 |
| 4,767,800 | A | * | 8/1988 | Neu et al. | 523/141 |
| 4,901,472 | A | * | 2/1990 | Donohue et al. | 47/2 |
| 4,943,705 | A | * | 7/1990 | Halloran | 219/385 |
| 5,025,777 | A | * | 6/1991 | Hardwick | 126/263.02 |
| 5,103,790 | A | * | 4/1992 | Hardwick | 126/263.02 |
| 5,125,392 | A | * | 6/1992 | Hardwick | 126/263.02 |
| 5,180,759 | A | * | 1/1993 | Neu et al. | 523/141 |
| 5,210,396 | A | * | 5/1993 | Sanders | 219/521 |
| 5,407,741 | A | * | 4/1995 | Ota | 428/323 |
| 5,658,583 | A | * | 8/1997 | Zhang et al. | 424/402 |
| 5,738,082 | A | * | 4/1998 | Page et al. | 126/263.01 |
| 5,919,479 | A | * | 7/1999 | Zhang et al. | 424/449 |
| 6,092,519 | A | * | 7/2000 | Fish et al. | 126/263.01 |
| 6,164,442 | A | * | 12/2000 | Stravitz | 206/233 |
| 6,209,457 | B1 | * | 4/2001 | Kenworthy et al. | 102/306 |
| 6,284,266 | B1 | * | 9/2001 | Zhang et al. | 424/449 |
| 6,331,696 | B1 | * | 12/2001 | Nakamura et al. | 219/386 |
| 6,336,935 | B1 | * | 1/2002 | Davis et al. | 607/112 |
| 6,392,200 | B1 | * | 5/2002 | Nakamura et al. | 219/386 |
| 6,497,341 | B1 | * | 12/2002 | Motsenbocker | 221/63 |
| 6,540,084 | B2 | * | 4/2003 | Silvers | 206/581 |
| 6,546,281 | B1 | * | 4/2003 | Zhang et al. | 604/20 |
| 6,723,079 | B2 | * | 4/2004 | Cline | 604/337 |
| 6,776,305 | B2 | * | 8/2004 | Motsenbocker | 221/63 |
| 6,847,011 | B2 | * | 1/2005 | McConnell et al. | 219/386 |
| 6,893,453 | B2 | * | 5/2005 | Agarwal et al. | 607/108 |
| 7,022,945 | B1 | * | 4/2006 | Western | 219/386 |

(Continued)

*Primary Examiner* — Jorge Pereiro
(74) *Attorney, Agent, or Firm* — Factor Intellectual Property Law Group, Ltd.

(57) ABSTRACT

A heater in a housing with an opening. The heater reacts with oxygen to produce heat and upon consumption of the oxygen, the heating reaction stops and can be restarted at a later point in time upon the introduction of additional oxygen and is used in a package for heating pre-moistened substrates such as sanitary wipes, and the like.

20 Claims, 9 Drawing Sheets

(56) References Cited

U.S. PATENT DOCUMENTS

| | | | |
|---|---|---|---|
| 7,052,167 B2 * | 5/2006 | Vanderschuit | 362/572 |
| 7,094,992 B1 * | 8/2006 | Wray et al. | 219/386 |
| 7,338,516 B2 * | 3/2008 | Quincy et al. | 607/96 |
| 7,438,873 B2 * | 10/2008 | Saxon et al. | 422/305 |
| 7,497,351 B2 * | 3/2009 | Amundson et al. | 221/96 |
| 7,722,782 B2 * | 5/2010 | Coffey et al. | 252/70 |
| 7,763,061 B2 * | 7/2010 | Schorr et al. | 607/108 |
| 7,842,365 B2 * | 11/2010 | Riggs | 428/41.8 |
| 7,850,041 B2 * | 12/2010 | Amundson et al. | 221/96 |
| 2002/0083685 A1 * | 7/2002 | Zhang et al. | 53/474 |
| 2002/0174863 A1 * | 11/2002 | Saric et al. | 126/263.05 |
| 2004/0042965 A1 * | 3/2004 | Usui et al. | 424/40 |
| 2004/0089578 A1 * | 5/2004 | Lin | 206/494 |
| 2004/0178384 A1 * | 9/2004 | Usui | 252/76 |
| 2005/0187597 A1 * | 8/2005 | Vanderschuit | 607/88 |
| 2005/0224388 A1 * | 10/2005 | Saric et al. | 206/554 |
| 2006/0104868 A1 * | 5/2006 | Saxon et al. | 422/125 |
| 2006/0235494 A1 * | 10/2006 | Vanderschuit | 607/89 |
| 2006/0266358 A1 * | 11/2006 | Hoogland | 128/205.13 |
| 2007/0034202 A1 * | 2/2007 | Pumphrey et al. | 126/263.01 |
| 2007/0068339 A1 * | 3/2007 | York-Leung Wong et al. | 75/230 |
| 2007/0068508 A1 * | 3/2007 | York-Leung Wong | 126/263.02 |
| 2007/0087152 A1 * | 4/2007 | Riggs | 428/40.1 |
| 2007/0267595 A1 * | 11/2007 | Dodo | 252/67 |
| 2008/0289657 A1 * | 11/2008 | Arjomand | 134/21 |
| 2010/0146849 A1 * | 6/2010 | Coffey et al. | 44/504 |

\* cited by examiner

REUSABLE HEATER IN A PACKAGE

RELATED APPLICATIONS

This application is a Continuation in Part of U.S. patent application Ser. No. 12/376,927 filed on Feb. 9, 2009, which claims the filing benefit of International Patent Application No. PCT/US2007/075740, filed Aug. 10, 2007, which claims the filing benefit of U.S. Provisional Patent Application No. 60/837,029 filed Aug. 10, 2006, the contents of all of which are incorporated herein by reference. This application also claims priority to U.S. Provisional Patent Application No. 61/354,004 filed Jun. 11, 2010, the content of which is incorporated herein by reference.

FIELD OF THE INVENTION

The present invention relates to portable flameless heaters that produce heat upon reaction with oxygen and methods of manufacturing and packaging same.

BACKGROUND OF THE INVENTION

Portable flameless heaters are currently used in a variety of applications, for example heating comestible items. For example the United States Army uses a flameless ration heater (FRH) rather than a portable camp-stove to heat a pre-packaged MRE (meal ready to eat) eight-ounce (approximately 227 grams) field ration. The FRH consists of a super-corroding magnesium/iron mixture sealed in a waterproof pouch (total FRH weight is approximately 22 grams). To operate a FRH, the pouch is opened into which the MRE is inserted, and approximately 58 grams of water is added to a fuel-containing portion of the FRH pouch surrounding the MRE to initiate the following reaction:

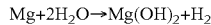

$$Mg + 2H_2O \rightarrow Mg(OH)_2 + H_2$$

Based upon the above reaction of the fuel, the MRE temperature is raised by approximately 100° F. in less than 10 minutes. The maximum temperature of the system is safely regulated to about 212° F. by evaporation and condensation of water vapor.

The current FRH, while effective for its intended purpose, produces hydrogen gas as a byproduct, generating safety, transportation, storage and disposal concerns, and making it less suitable for use in consumer sector applications where accidental misuse could lead to fire or explosion.

Also, the water required for reaction, in addition to being heavy and spacious, is typically obtained from a soldier's drinking water supply, which is often limited. Addition of the water can also be an inconvenient additional step in the process of activating the FRH.

Self-heating food packaging products are also available in the consumer market. These products use the heat of hydration from mixing "quicklime" (calcium oxide) and water ($CaO + H_2O \rightarrow Ca(OH)_2$) which does not generate hydrogen. With water present the peak temperature is similarly limited to 212° F. but even neglecting the weight of packaging and water, the specific energy of the system is low (approximately 1.2 kJ per gram of CaO). These and other self-contained systems must also provide some means of mixing the segregated reactants adding further complexity and bulk. Measurements on some commercial self-heating packaged food products are shown in Table 1.

TABLE 1

| | Food product (net) | | Total package (gross) | | Specific energy of heater (kJ/g) |
|---|---|---|---|---|---|
| | Weight (g) | Volume (ml) | Weight (g) | Volume (ml) | |
| Coffee | 300 | 295 | 551 | 600 | 0.34 |
| Beef stew | 425 | 481 | 883 | 963 | 0.13 |

While quicklime based heaters may offer greater safety than the Mg based heaters, quicklime heaters significantly lower specific energy and cause the weight and size of the heater to approach that of the object being heated, reducing portability.

In addition to the water-based heaters described above, it is known to utilize oxygen-based heaters. Oxygen-based heaters, such as those described in U.S. Pat. Nos. 5,984,995, 5,918,590 and 4,205,957, have certain benefits over water-based heaters.

First, oxygen-based heaters do not require the addition of water to generate heat. Second, because the oxygen-based heater generates heat only in the presence of oxygen, the reaction may be stopped by preventing oxygen access and then restarted at a later time.

Despite the advantages of oxygen-based heaters, there is still a need for improved oxygen-based heaters, as well as methods of manufacturing same.

In addition, it would be beneficial to use such an oxygen-based heater in the heating of an object such as sanitary wipes and/or baby wipes, as well as utilize such heaters in a housing for heating the sanitary wipes/or baby wipes.

SUMMARY OF THE INVENTION

In one aspect of the invention, the invention comprises a portable flameless heating apparatus comprising a flexible porous substrate formed into a desired shape, the substrate includes a reducing agent providing an exothermic reaction upon oxidation, a promoter for the reduction of oxygen, and a binding agent. Once electrolyte is added, the portable flameless heating apparatus will generate heat upon reaction with oxygen. Unlike the water-based heaters, the present heater takes advantage of the ambient oxygen present in the atmosphere. Thus, a user need not physically transfer or add a reagent to the portable flameless heating apparatus, as all of the required reactants are either present in the heater, or present in the atmosphere. This benefit, as well as others, will be readily apparent based upon the description of the preferred embodiments.

In another aspect of the invention, the invention generally comprises the steps of mixing a reducing agent, a promoter for reducing oxygen, and a binding agent to form a mixture. The mixture is then formed into a substrate with a desired shape, and, then stored in ambient or another oxygen-containing atmosphere. This aspect has substantial benefits in the manufacturing process. For example, the method allows a substrate to be produced and stored for a commercially acceptable period of time until the substrate is needed to produce a specific portable flameless heating apparatus configuration. Additionally, the desired shape of the substrate may initially be a stock shape sized for later reforming or dividing into smaller sizes as desired for use with differing applications. This too is believed to have substantial benefits for a manufacturing process, such as, allowing multiple heater designs to be made from one stock material. Other benefits of this aspect of the invention will be appreciated and understood based upon the description of the preferred embodiments.

Pre-packaged cloth or cloth-like substrates used for example cleaning, or applying a liquid or semi-liquid to a person or object are in wide-spread use. It has been determined by the inventors hereof that solubility of substances to be removed, viscosity of the liquid carried by the substrate (often referred to as a "wipe"), and in some cases chemical efficacy of the liquid could be improved with heating the wipe prior to use. It was also determined that comfort could be improved if the temperature of a liquid permeating a wipe for use on skin could be raised above ambient before use.

It was also determined according to the invention(s) that embodiments of the above summarized invention(s) could advantageously be employed for portable heating of pre-packaged wipes. In addition, according to another aspect of the invention(s) is a unique structure and method for providing a self-heated pre-packaged wipe, which generally includes a housing having at least one opening and a reaction chamber and, a heater disposed in the housing, wherein upon introduction of oxygen to the reaction chamber through the opening, the heater reacts with the oxygen to produce a controlled amount of heat, and upon consumption of the oxygen the heater ceases reacting to produce heat until an additional amount of oxygen is introduced into the reaction chamber.

The opening may be resealable and the heater may include two openings. A resealable opening may include an opening that is provided with a removable cap to open and close the opening when desired.

An embodiment of the heater may include an air-metering pump for providing the introduction of the oxygen. Such an air-metering pump may include a spring.

An embodiment of the invention may further include an object to be heated that is disposed in the housing adjacent the heater. The object may be a plurality of sanitary wipes arranged in a stack or other arrangement for dispensing wipes individually. The housing may include a dispensing slot for removing a top wipe from the stack and may further include a platform and a spring disposed in the housing such that a bottom wipe of the stack is adjacent the platform and the spring biases the platform towards the heater. It is also contemplated that an embodiment of the heater may include a diffuser disposed between the at least one opening and the heater.

In another embodiment of the invention, the invention relates to a portable heater which includes a housing having an air inlet, an air vent and a reaction chamber and, a heater disposed in the housing, wherein upon an introduction of a controlled amount of oxygen to the reaction chamber through the air inlet, the heater reacts with the oxygen to produce a controlled amount of heat, and upon consumption of the oxygen the heater ceases reacting to produce heat until an additional amount of oxygen is introduced into the reaction chamber.

It is contemplated that in some embodiments the oxygen would be consumed in 30 to 60 seconds.

The heater of this embodiment may further include an air metering pump which may form part of the housing and may further include a spring. In addition, the air inlet and air vent may be disposed on the air metering pump.

It is also contemplated that an embodiment of the heater may include a diffuser.

Further, the heater of this embodiment may also include an object to be heated and the object may be a plurality of sanitary wipes arranged in a stack. In such an embodiment of the invention, the housing may include a dispensing slot for removing a top wipe from the stack.

A heater according to one or more embodiments would be beneficial for a number of reasons. First, using the oxygen based heater allows the heating reaction to be initiated and stopped multiple times until the reactants are used up. In addition, since the atmosphere provides an ample amount of oxygen, the heater may easily be provided with oxygen to produce heat by, for example, including a mouth piece to allow a user to blow into the housing to provide oxygen for a short reaction to produce heat. Moreover, the heater is relatively safe as the heating reaction can be stopped merely by blocking access of oxygen to the heater. These and other benefits of the embodiments of the present invention will be readily apparent to those of ordinary skill in the art after reviewing the present disclosure.

DETAILED DESCRIPTION OF EXEMPLARY EMBODIMENTS

Figure 1:
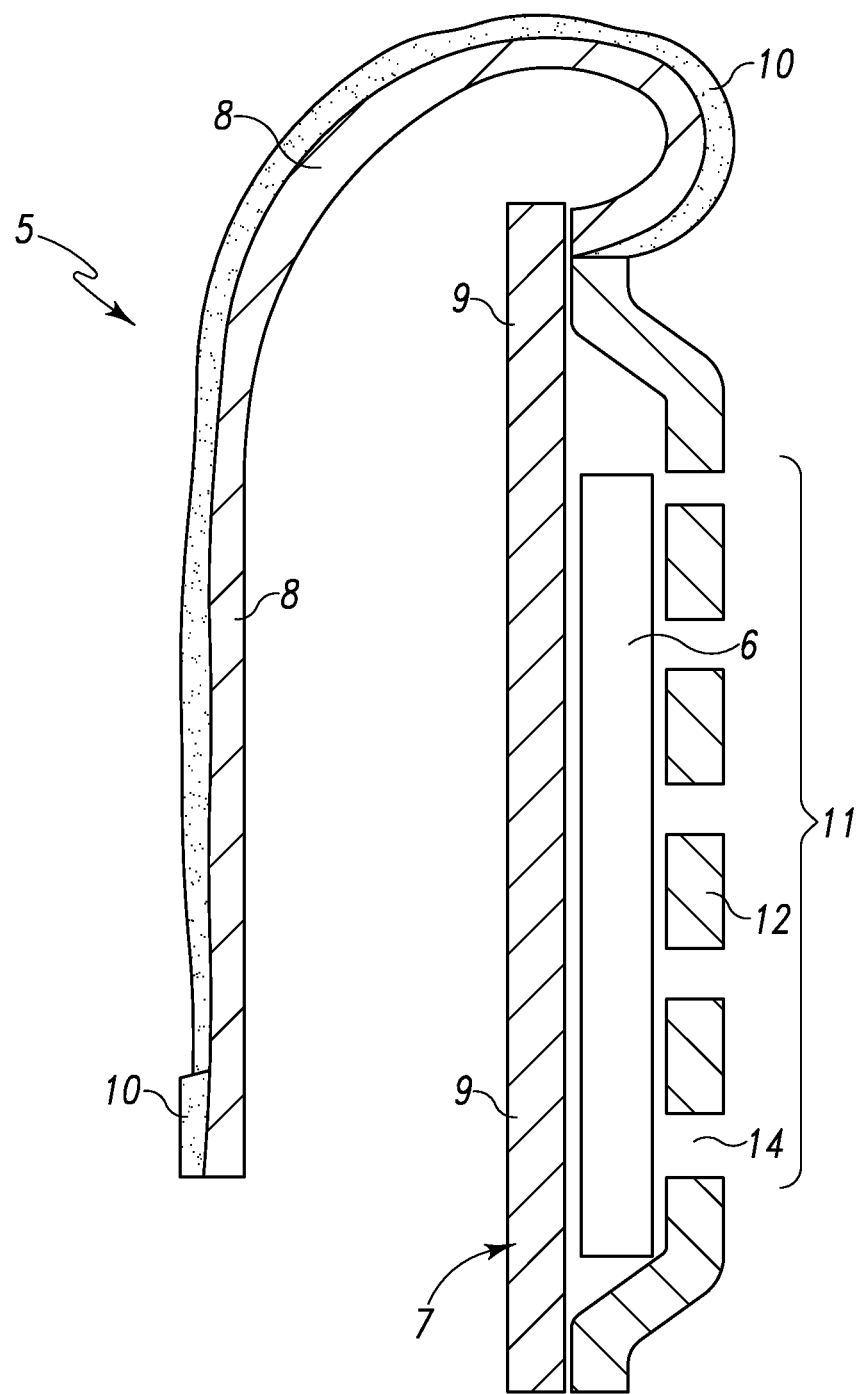
FIG. 1 is a cutaway side view of a portable flameless heating apparatus according to the invention.

While this invention is susceptible of embodiment in many different forms, there is shown in the drawings and will be described in detail, specific embodiments with the understanding that the present disclosure is to be considered as an exemplification of the principles of the invention and is not intended to limit the invention to the embodiments illustrated.

It should be understood that like or analogous elements and/or components, referred to herein, are identified throughout the drawings by like reference characters. In addition, it should be understood that the drawings are primarily symbolic and are only meant to aid in understanding the ideas and concepts disclosed.

Heater

In one aspect of the invention, a portable flameless heating apparatus comprises a flexible porous substrate formed into a desired shape, the substrate includes a reducing agent providing an exothermic reaction upon oxidation, a promoter for the reduction of oxygen, and a binding agent. The reducing agent is preferably selected from the group consisting essentially of: zinc, aluminum, or magnesium. The promoter is carbon and may or may not have addition chemicals or compositions added to it. At least during operation (versus storage), the substrate includes an electrolyte. The electrolyte is alkaline, preferably potassium hydroxide. The binding agent is preferably chosen to assist in providing porosity in the substrate and according to one aspect of the invention to also aid in allowing the substrate to be flexible. In a preferred embodiment, the binding agent is polytetrafluoroethylene which aids in providing both of these attributes. The polytetrafluoroethylene may be in the range of 1% to 40% of the total weight of the substrate. The binding agent may comprise a mixture of chemical compounds.

Forming a substrate with an integral shape, as opposed to simply providing a particulate mixture of the chemical constituents of the heater, provides the benefits accompanying the use of integral structures in product design, for example, structural integrity of the heater. The flexibility of the portable flameless heating apparatus supplies numerous benefits. For example, as a preformed stock material or packaged heater, a portable flameless heating apparatus may be bent, or displaced, to fit containers having varied shapes and dimensions.

When charged with an electrolyte, the portable flameless heating apparatus further comprises a container surrounding the porous substrate to segregate the substrate from an atmosphere outside of the container. In one embodiment, the container has at least one resealable opening to selectively permit ambient atmosphere to access the substrate for purposes of oxygen reaction with the substrate. A re-sealable opening may include (but certainly is not limited to): pressure sensitive adhesive, mechanical tongue-and-grove structure, elastic or twist locks, or any other structure that may selectively permit resealing the opening. In one embodiment it is also contemplated that the opening includes an oxygen-permeable barrier to cover the substrate when the opening is unsealed to maintain physical isolation or sequestration of the substrate within the container while permitting access to oxygen. Varying the permeability of the barrier may be used to control the rate of heat production. A barrier that allows a large flow of oxygen in will allow for a faster rate of reaction, and a barrier that lets a small amount of oxygen in will allow for a slower rate of reaction.

FIG. 1 discloses a portable flameless heating apparatus 5. The portable flameless heating apparatus 5 comprises a substrate 6 (in the form of a thick, or plate-like sheet) is surrounded (for segregation from the atmosphere) by a container 7 which has front flap 8 and a back flap 9 both of which are oxygen-impermeable (it is recognized that materials which have a relatively low level of oxygen-permeability may be used). The front flap 8 has a pressure sensitive adhesive 10 around a marginal edge perimeter thereof. The front flap 8 (when closed) segregates the substrate 6 from oxygen. The front flap 8 may be partially removed to expose an opening 11, which in turn exposes the substrate 6 to oxygen. Within the opening 11 there is an oxygen-permeable barrier 12. The oxygen-permeable barrier 12 secures the substrate 6 in the container 7. The oxygen-permeable barrier 12 has apertures 14 which allow oxygen to reach the substrate 6 of the portable flameless heating apparatus 5. Once the item to be heated has been heated to the desired temperature, the front flap 8 may be used to close the opening 11 and the pressure sensitive adhesive portion 10 may hold the front flap 8 in place while providing an air-occlusive seal. The reaction will stop producing heat once all of the oxygen within the container 7 has been reacted.

Since the reaction is oxygen based, the reaction can be stopped by closing the opening(s) and cutting off oxygen access. If not all of the reducing agent has reacted, the portable flameless heating apparatus, unlike water based heaters, may be restarted and used to subsequently heat the same or a second item.

In another embodiment, the portable flameless heating apparatus comprises a flexible porous substrate formed into a desired shape, the substrate including a reducing agent selected from the group consisting essentially of: zinc, aluminum, or magnesium providing an exothermic reaction upon oxidation, carbon as promoter for the reduction of oxygen, an alkaline electrolyte, and, a polytetrafluoroethylene binding agent, and, a container surrounding the substrate to segregate the substrate from an atmosphere outside of the container, the container having at least one re-sealable opening to selectively permit ambient atmosphere to access the substrate for purposes of oxygen reaction with the substrate.

It is further contemplated that the desired shape of a substrate may be formed to have a preformed contour substantially mating with a contour of a portion of the outer surface of a container (such as a container for containing a substance to be heated such as a comestible) required for the desired heat transfer from the apparatus to the contents of the container. By use of the term preformed, it is meant that the substrate, for example, may be molded, pressed into a mold or is wrapped around the outer surface of the container.

Figure 2:
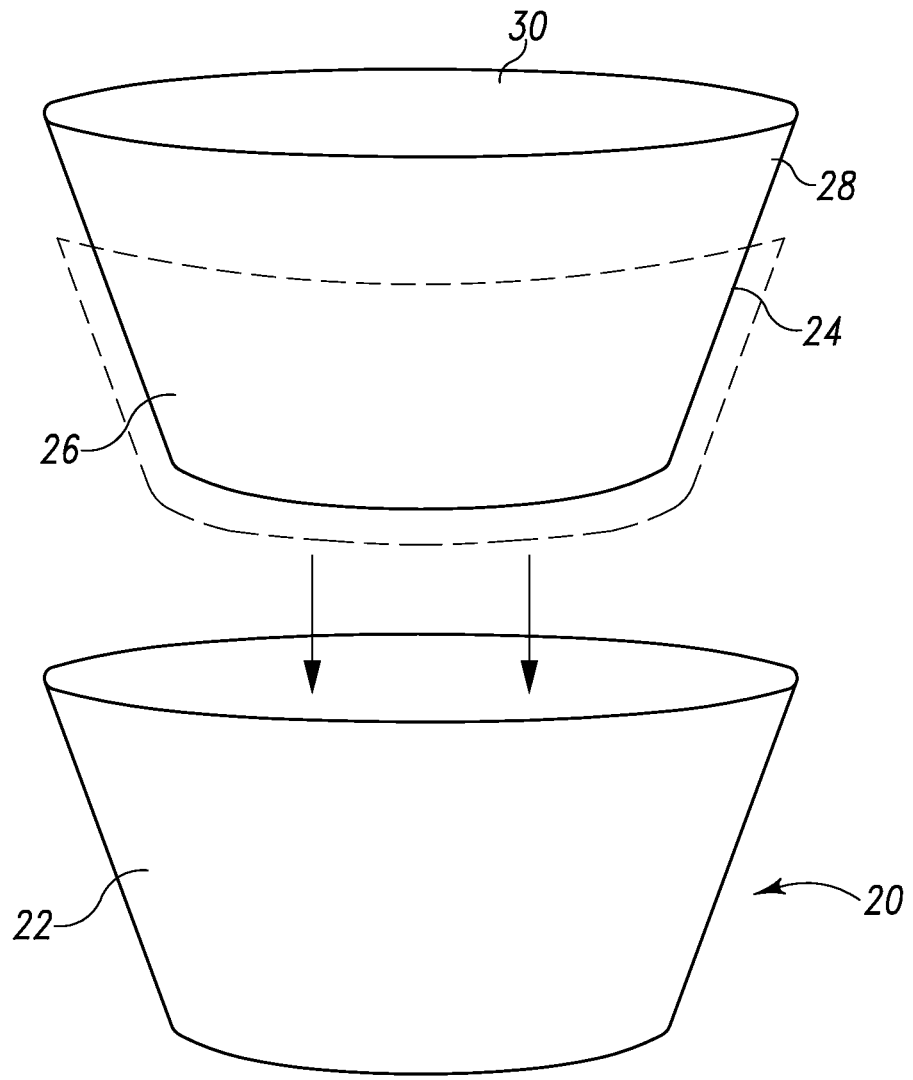
FIG. 2 is a perspective exploded view of a portable flameless heating apparatus according to the invention.

FIG. 2 discloses a portable flameless heating apparatus 20 which is preformed into a desired shape 22. The desired shape 22 mates with the contour 24 of a portion 26 of the outer surface 28 of a container 30 which may contain a comestible.

Another desired shape of a substrate is a stock shape sized for later reforming or dividing into smaller sizes as desired for use with differing applications. It is believed that any suitable method may be used to manufacture the stock shape, including, but not limited to, rolling, extruding, pressing, forming, stretching, etc.

The stock shape may be any shape, including, but not limited to, conventional sheet stock, rod stock, bar stock, and tube stock. Sheet stock may be a thick sheet, e.g. "plate," or it may be a thin sheet, e.g., "film." Rod stock, too, may be a thick rod, or a thin rod, like a rope or a wire. Similarly, bar stock and tube stock may be thick or thin, depending on the desired application. Moreover, the stock material may be extruded cylinders, triangles, square tubes or any other shape. The stock material is sized for later reforming or dividing into smaller sizes for use or further reforming as desired for use with differing applications.

Utilizing thinner desired shapes and thinner stock shapes is believed to have additional benefits. For example, a thinner sheet may be wrapped around a container multiple times instead of using a single wrap with a thick stock. Similarly, a thinner rod or "wire" may also be wrapped around a container, e.g., wound. The thinner shapes are believed to have increased flexibility. Additionally, by utilizing thinner shapes, it is contemplated that the portable flameless heating apparatus may not need adhesive or other structure or composition to assist in keeping it disposed adjacent to the container or object to be heated.

Method

Another aspect of the invention provides a novel method to construct a portable flameless heating apparatus.

Figure 3:
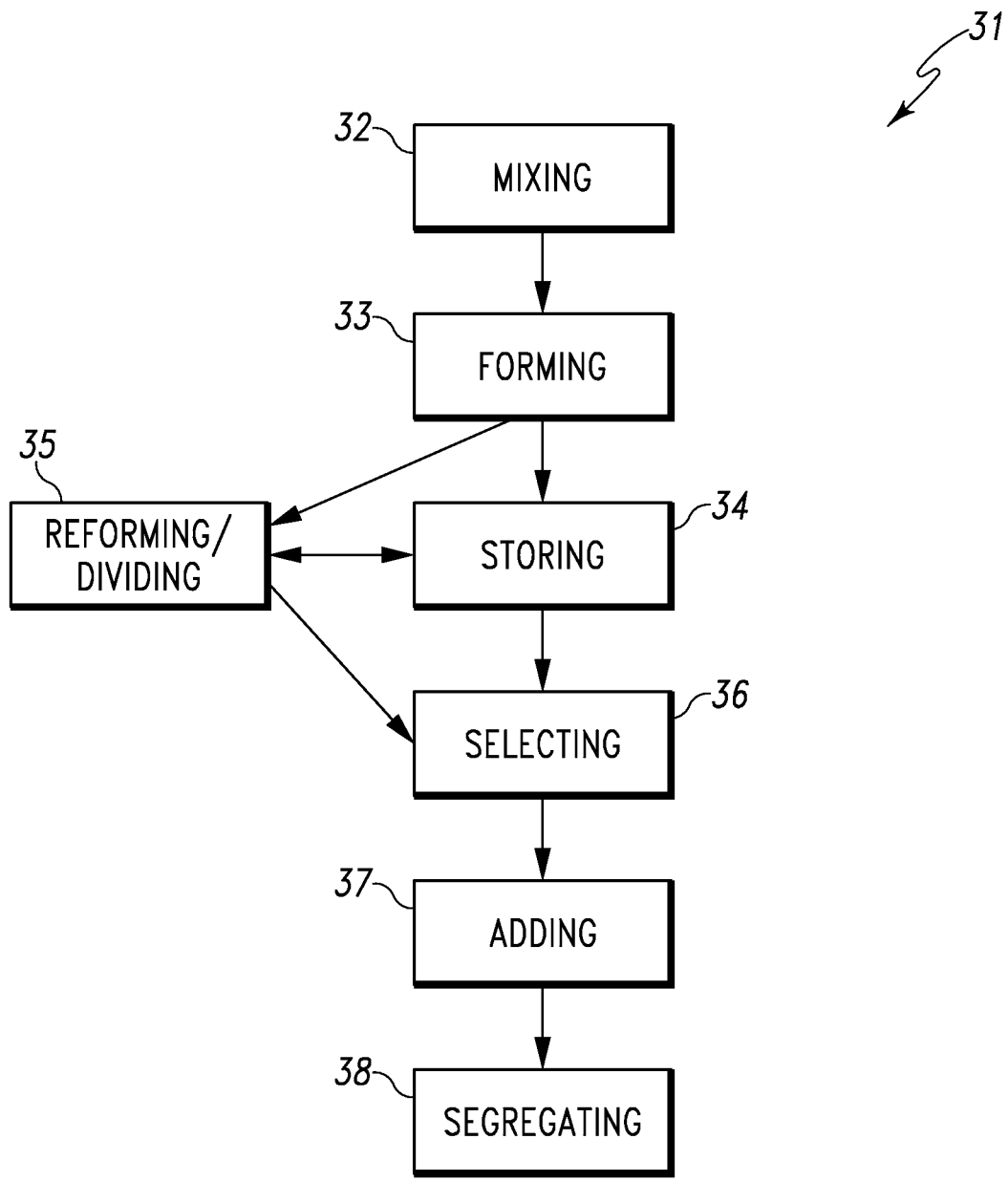
FIG. 3 is a flow chart of one embodiment of a method according to the present invention.

FIG. 3 discloses a preferred method 31 according to this aspect of the invention. The method comprises the steps of mixing (32) a reducing agent, a promoter for reducing oxygen, and a binding agent to form a mixture, forming (33) the mixture into a substrate with a desired shape, and, then storing (34) the substrate in ambient or other oxygen containing atmosphere. By storing it is meant that the substrate can be stored for a commercially acceptable period, or "shelf life," such that based upon the concentration, the porosity of the substrate, the chemicals comprising the substrate, and other factors, the substrate will still be able to produce the required heat when the substrate is integrated into an end use such as a heater. It is preferred that the desired shape is flexible.

In step (33) the desired shape of the substrate may be preformed into a contour substantially mating with a contour of a portion of an outer surface of a container for containing a comestible required for the desired heat transfer from the apparatus to the comestible e.g. see FIG. 2.

Alternately in the step (33), the desired shape of the substrate may be formed as a stock shape, as described above, which may include the later step (35) of reforming or dividing the stock material into smaller size substrates as desired for use with differing applications. The stock shape may be any shape, including, but not limited to, sheet stock, rod stock, bar stock, and tube stock. Sheet stock may be a thick sheet, e.g. "plate," or it may be a thin sheet, e.g., "film." Rod stock, too, may be a thick rod, or a thin rod, like a wire. Similarly, bar stock and tube stock may be thick or thin, depending on the desired application. Moreover, the stock material may be extruded cylinders, triangles, square tubes or any other shape. The stock material is sized for later reforming or dividing into smaller sizes for use or further reforming as desired for use with differing applications. As noted above it is believed that the thinner desired shapes and thinner stock shapes may have additional benefits from thicker stock in terms of manufacturing and design flexibility and scalability.

The inventors of the present invention have determined that varying the concentration of the electrolytic solution can control the rate of the reaction. For example, if a desired application needs a faster more immediate need of heat (higher temperature or flux), as may be required for suitably heating a container of food in an acceptable time frame, then an electrolyte with a relatively higher concentration may be used. However, if a longer, more prolonged heat generation or lower temperature is required for the substance to be heated, then an electrolyte with a lower concentration may be used. Utilizing this aspect in the manufacturing process can have substantial benefits for scalability and reduced part count, as is true for the other aspects of the invention disclosed herein, i.e., flexibility of the substrate, manufacturing stock shapes of the substrate, and manufacturing and storage of the substrate in ambient air. For example, selecting the concentration of the electrolyte after substrate manufacture, allows a manufacturer to mass-produce a stock material, which may be produced in an ambient atmosphere wherein oxygen is present, then, as the need arises, the stock material may be reformed or divided and then reformed into smaller portable substrates for various applications before the electrolyte is added. The electrolyte may then be selected and matched with substrates for further packaging for various differing applications.

Accordingly, as disclosed in FIG. 3 a method of manufacturing a portable flameless heating apparatus may further comprise the step (36) of selecting a desired rate of reaction as influenced by the electrolyte, and/or selecting an electrolytic solution to provide the selected rate of reaction, and, then provide the step (37) of adding the selected electrolytic solution to the substrate. In this way, the rate of reaction is controlled, at least in part by utilizing an appropriate electrolyte concentration. In addition, since the reaction is driven by oxygen, and will only begin once the electrolyte is added, the electrolyte may be added in an oxygen containing atmosphere. This may have additional benefits in the manufacturing process. For example, there would be no need to create an oxygen-free atmosphere for the manufacturing process. Sequestering or encasing the portable substrate such as in packaging, once the electrolyte has been added and the substrate has begun to generate heat, may be conducted in such a way as to permit only a negligible amount of reaction, such as by varying packaging time, amount of reagent used, etc. Once contained, the reaction will create a negative pressure (within the container), which advantageously will aid in initially drawing oxygen in as the heater is later put into use and exposed to oxygen by a user.

Accordingly, as disclosed in FIG. 3, a method of manufacturing may further comprise the step (38) of segregating, such as by surrounding the substrate in a container to segregate the substrate from an atmosphere outside of the container, wherein the container has at least one resealable opening to selectively permit ambient atmosphere to access the substrate for purposes of oxygen reaction with the substrate.

EXAMPLES

The following examples disclose prototypical heaters and methods for making same according to the invention.

Three liters of de-ionized water were placed into a reaction vessel equipped with a stirring paddle. Then, 0.345 g of $KMnO_4$ was added to the water and stirred until dissolved. Subsequently, 40 g of acetylene carbon black were added to the water while slowly stirring the water, and the mixture was stirred for approximately 30 minutes. The mixture was then filtered through a filter funnel using a vacuum assist. The filtered carbon material was then placed in a drying container and dried at 95° C.

Additionally, 1 g of $In(OH)_3$ and 1 g of $In_2(SO_4)_3$ were mixed with 200 ml of de-ionized water and stirred to form a suspension.

Then 100 g of zinc alloy, such as BI 100 230 d70 produced by Umicore, was placed in a mixing bowl. Thirty-eight milliliters of the saturated indium solution was added to the mixing bowl containing the zinc alloy and stirred for approximately 1 minute. The mixture was then allowed to rest for approximately 15 minutes. Eight grams of treated carbon were then added to the mixture and the mixture was stirred at medium speed for approximately 1 minute. The mixing bowl was scraped and then an additional 30 seconds of mixing was performed, followed by a scraping of the bowl.

Fifteen grams of polytetrafluoroethylene suspension was added to the mixture and mixed at low speed for 1 minute, followed by scraping and mixing for an additional 30 seconds. The mixture was then formed into a ball shape similar to a dough ball and removed for further processing.

The ball was formed into a rectangular shaped brick. The rectangular shape was then processed through a roll milling process to form thinner and thinner sheets stopping at a final desired thickness for the particular type of heater sheet. The sheet was then placed in an oven at 95° C. to dry. After removing the sheet from the oven the resulting heater sheet is porous, cohesive and flexible, and may be cut into any desired dimensions for the particular application.

It is believed that the dry non-activated heater sheets can be stored in normal atmospheric conditions indefinitely, for use later as a heater. Other suitable methods of constructing the heater may include similar methods of extruding, roll coating, casting, or pasting known to those of skill in the art.

A portable flameless heating apparatus, prepared as described above, was taken into an inert atmosphere glove box. The material was then wetted with a 9N KOH solution (approximately 37% by weight). Approximately 23% by weight of KOH was added to the portable flameless heating apparatus. After the solution had soaked into the pores of the sheet, the sheet was formed to the outside circumference of a metal soup can. This can was then placed inside a larger can with an outer wall that provided openings. This can assembly was then placed in a sealed oxygen impermeable membrane to prevent it from being exposed to oxygen. The assembly was then removed from the glove box. The assembly was removed from the plastic bag and approximately 290 milliliters of water to be heated was added to the inner soup can. Two thermocouples were placed inside the soup can and a lid placed over the can. An additional thermocouple was placed on the surface of the sheet heater material.

Figure 4:
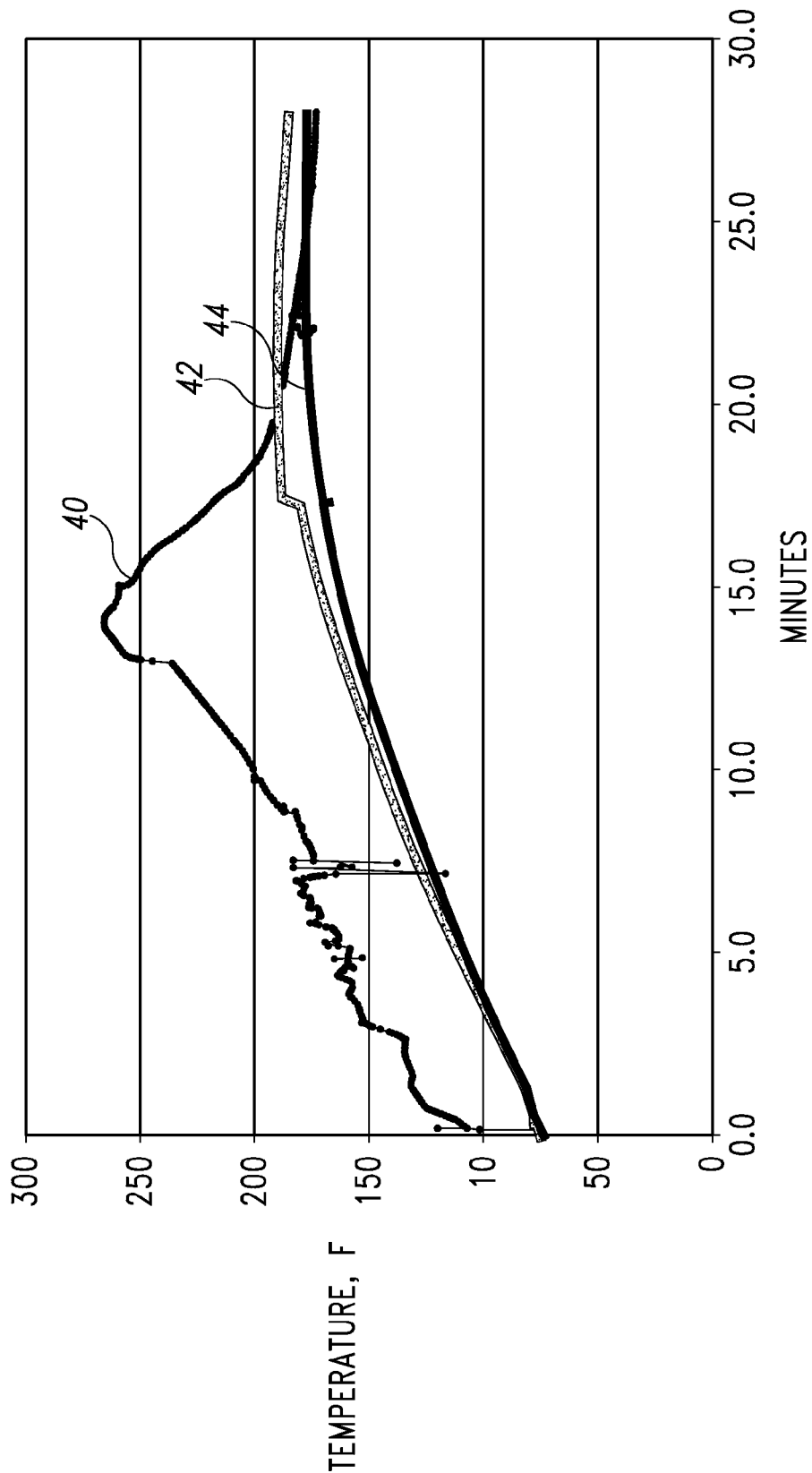
FIG. 4 is a graph of tests results of a sample of a portable flameless heating apparatus made according to the present invention.
Figure 5:
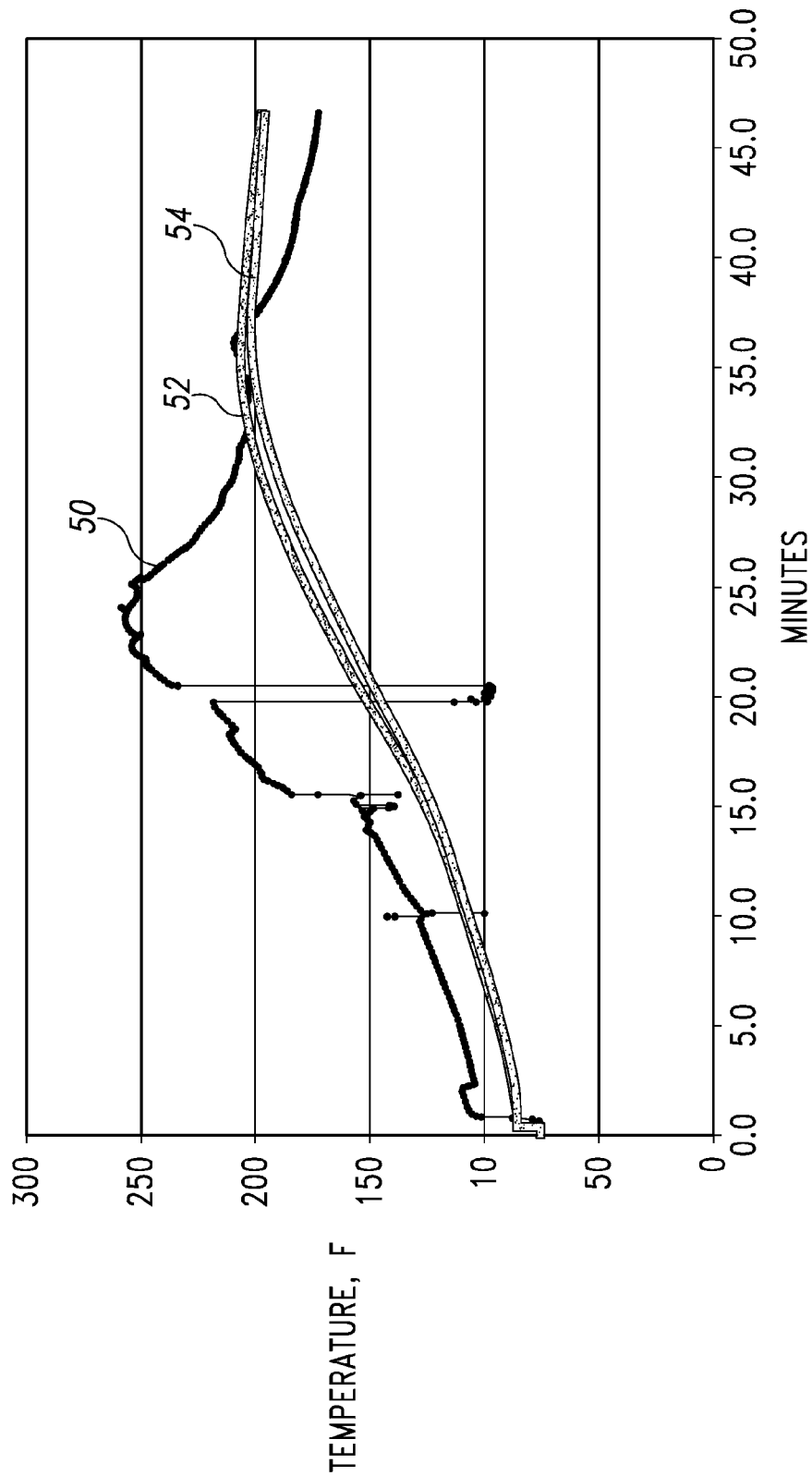
FIG. 5 is a graph of tests results of another sample of a portable flameless heating apparatus made according to the present invention.

FIG. 4 discloses that the portable flameless heating apparatus began to generate heat immediately after being exposed to the air. The maximum temperature reached on the heater surface 40 was approximately 260° F. The water temperature 42, 44 inside the soup can was raised to 191° F. from a starting temperature of 70° F. FIG. 5 discloses a second sample, wherein the heater surface 50 temperature was measured and the water temperature 52, 54 was raised to 201° F.

A third example of a portable flameless heating apparatus was prepared as described above and utilized to heat water in a flexible pouch similar to an MRE pouch. The portable flameless heating apparatus was placed on the outside surfaces of the pouch and sealed from the air. Inside the pouch on each side, directly opposite the portable flameless heating apparatus was an absorbent material that was wetted with water. The pouch was removed from the inert atmosphere. A water filled MRE pouch was placed inside the heater pouch. The water filled pouch was monitored with a thermocouple to determine the temperature change of the water over time. The portable flameless heating apparatus was then exposed to the air by removing the seals and allowing oxygen in the surrounding air, access to the heater. The portable flameless heating apparatus began to heat up and generated enough heat to raise the water temperature to 170° F. within approximately 9 minutes.

Figure 6:
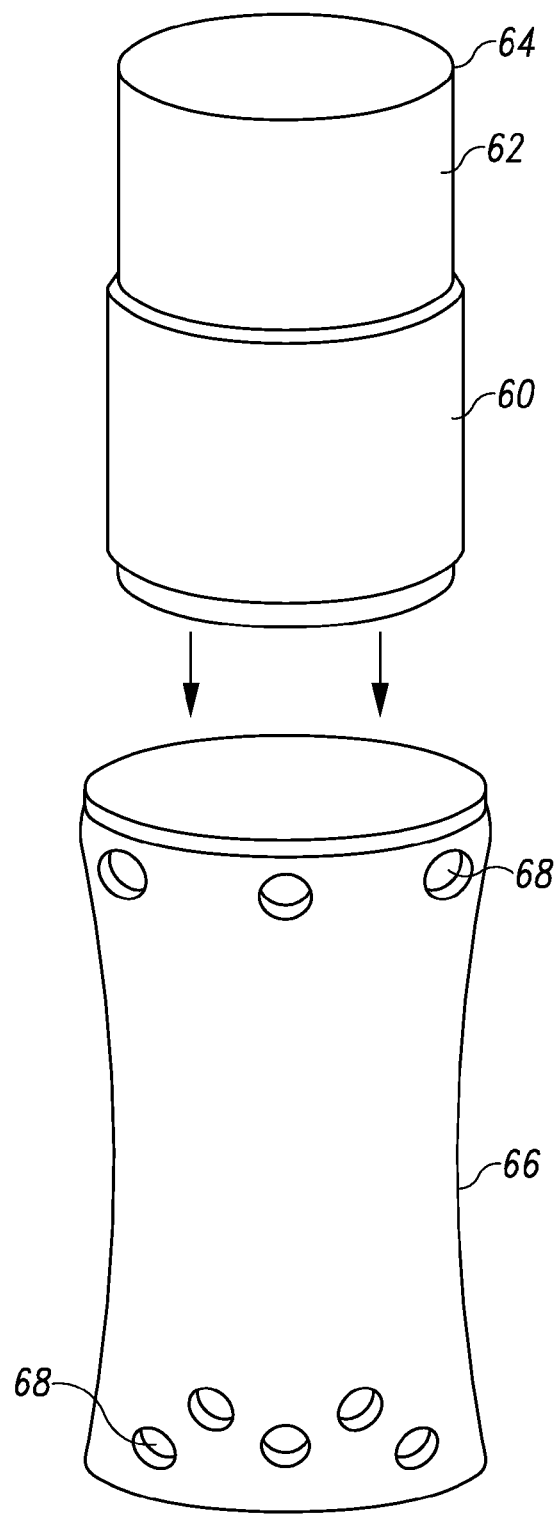
FIG. 6 is a partially exploded view of a portable flameless heating apparatus made according to the invention.

A fourth example was also tested. FIG. 6 discloses a single sheet shaped substrate 60, made by the method described herein, weighing approximately 56.7 grams was attached to the peripheral wall 62 of a metallic can 64 using an adhesive. The can 64 was capable of containing 6.5 ounces (190 ml) of fluid. After attaching the substrate 60 to the peripheral wall 62, the can 64 and outer container 66 were taken into an inert atmosphere glove box. The substrate 60 was then treated with a 50% by weight solution of KOH. Approximately 11.3 grams of solution was coated on the sheet and allowed to absorb into the sheet 60.

After the wetting and absorption process was complete the can 64 with attached portable flameless heating apparatus 60 was placed inside the outer container 66. The outer container 66 had openings 68. The entire assembly was then placed in an oxygen impermeable container and removed from the inert atmosphere glove box.

The assembly was then removed from the oxygen impermeable container and 190 ml of water was quickly added to the can 64. A thermocouple was placed in the middle of the inner can to monitor the temperature of the water. An additional thermocouple was attached to the portable flameless heating apparatus 60 to monitor the exterior surface temperature of the heater. The temperature rise was monitored and recorded.

Figure 7:
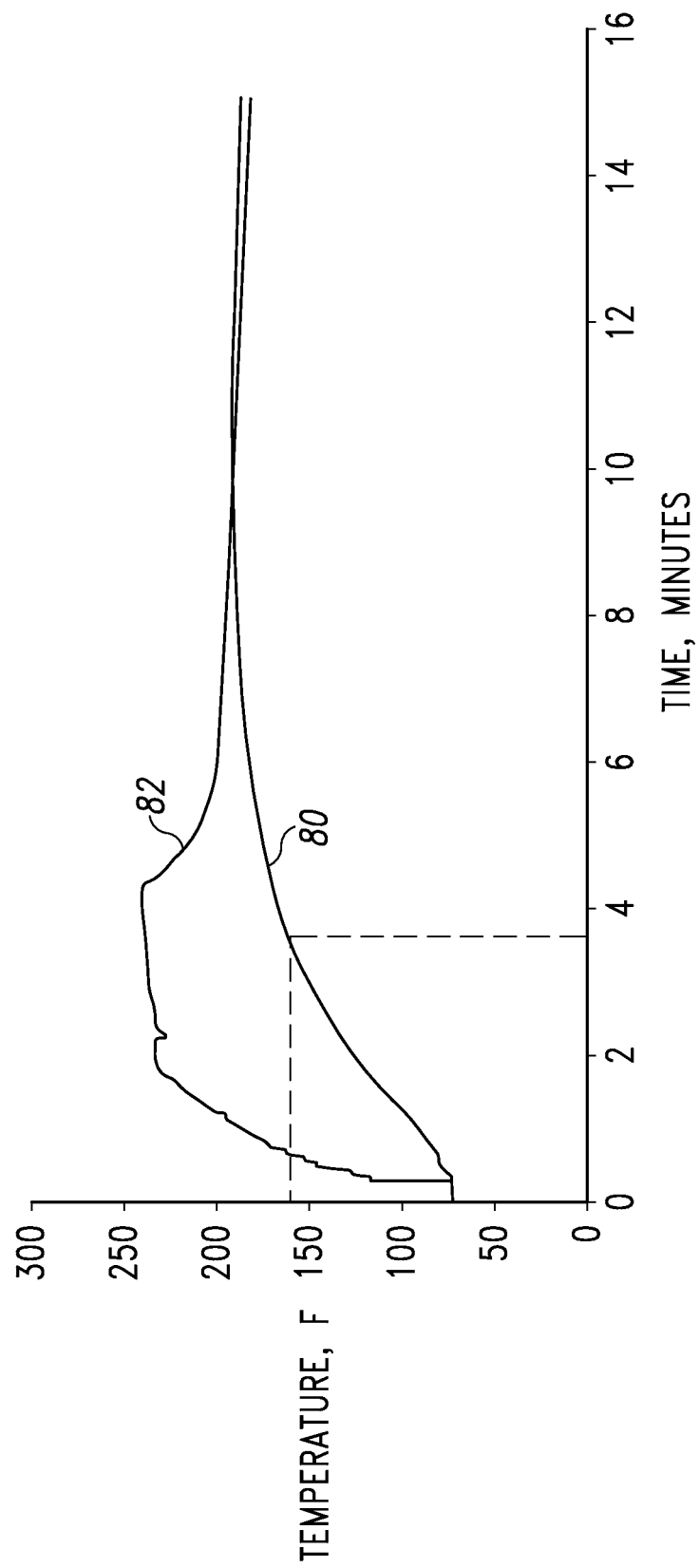
FIG. 7 is a graph of tests results of another sample of a portable flameless heating apparatus made according to the present invention.
Figure 8:
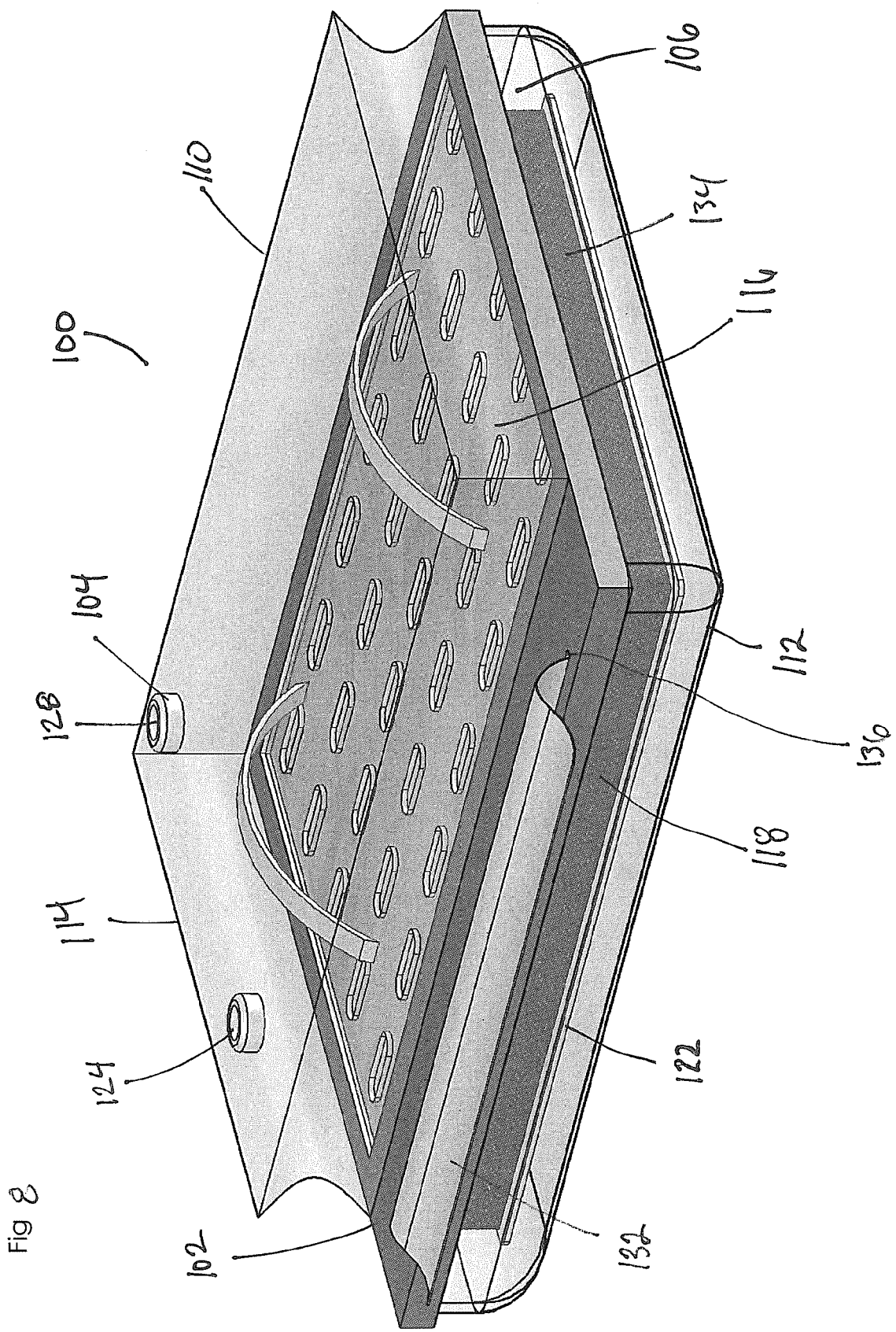
FIG. 8 is a partial cut away front perspective view of a heater according to an embodiment of the present invention.
Figure 9:
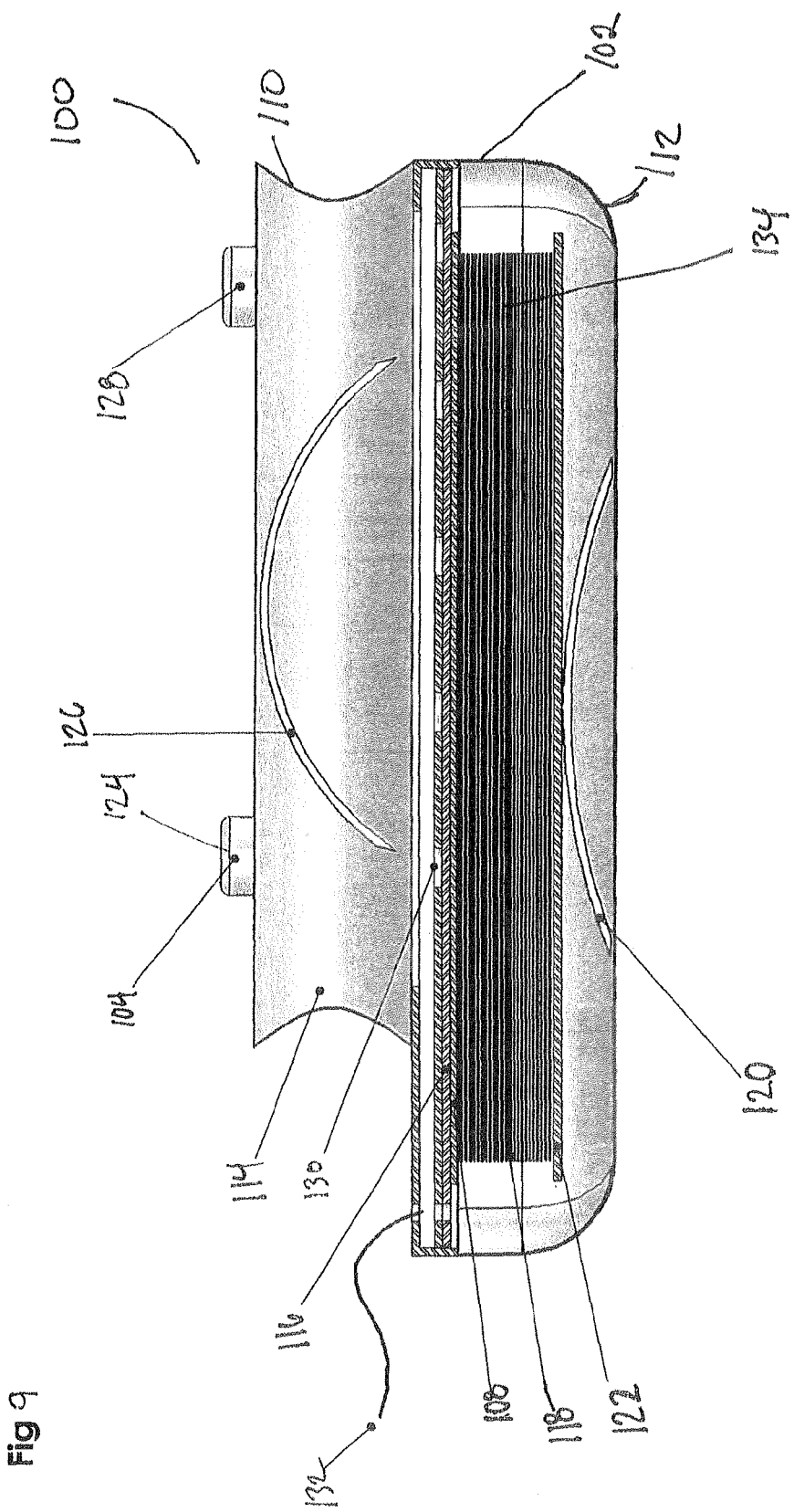
FIG. 9 is a side cut away view of a heater according to an embodiment of the present invention.

As disclosed in FIG. 7, the water temperature 80 and portable flameless heating apparatus temperature 82 started at approximately 74° F. The portable flameless heating apparatus temperature 82 rose rapidly reaching over 235° F. in less than two minutes. The water temperature 80 rose more slowly reaching 160° F. in 3.6 minutes. The water temperature 80 reached a maximum of 188° F. in 10.8 minutes and remained above 180° F. until the test was stopped at 15 minutes.

Heater in Packaging

In another aspect of the invention, the invention relates to a portable heater in a housing that may be used, for example, to heat an object such as a substrate carrying a liquid for transfer to an object or to skin and may be for example cosmetic wipes, sanitary wipes, "baby wipes," insect repellant wipes, medicine wipes, or cleaning solution wipes. As used hereinafter, the term "wipes" is meant to encompass these and others as exemplified above.

A portable heater 100 according to an embodiment of the present invention includes a housing 102 having at least one opening 104, a reaction chamber 106 and a heater 108 disposed in the housing 102.

The housing 102 may include a top compartment 110 and a bottom compartment 112. The top compartment 110 may include an air metering pump 114 and a diffuser 116. The bottom compartment 112 may include the wipes 118 (i.e., an object to be heated) and may further include a spring 120 and a plate 122.

When the air metering pump 114 is depressed, the oxygen free air inside is exhausted out through an opening 104, for example, an exhaust vent 124. When the air metering pump 114 is released, a spring 126 may return the air metering pump 114 to its original position, drawing in air through an opening 104, for example, an intake vent 128. It is contemplated that the opening 104 is resealable. The opening 104 may include structures integrally formed therein to make it resealable, or it may include a second structure, such as a cap, to make it resealable.

The oxygen in the air within the reaction chamber 106 will traverse through any internal holes 130 and/or through the diffuser 116 to reach the heater 108. The oxygen will then react with the heater 108 to produce heat.

In 30-60 seconds, the wipe 132 on the top of the stack 134 of wipes may be heated. Since essentially all of the oxygen in the reaction chamber 106 is consumed, the heating reaction will stop.

The wipe 132 can then be removed from the housing 102, for example, through a slot 136.

The spring 120 and the plate 122 keep the stack of wipes 134 pressed up against the heater 108, so that a top wipe is always ready to be heated.

Air is typically composed of approximately 78% nitrogen, 21% oxygen, and 1% other gases. The oxygen in the reaction chamber 106 causes the heater to begin heating and after 30-60 seconds, the wipe on the top is warm and ready to be used. The heater 108 will stop reacting once all of the oxygen has been consumed. The remaining gas would be nitrogen, which is inert in the heating reaction, and which is expelled upon a depression of the air metering pump 114.

This above described embodiment of a housing and a heater is believed to be beneficial for numerous reasons. First, it allows multiple wipes to be heated at various times with only one heater. Each wipe can be heated as needed from a single heater. If the user desires less heat, the wipe can simply be removed before it has been fully heated. If the user desires more heat, the air metering pump can be depressed more than once to bring more oxygen into contact with the heater. In addition, the device does not require a liquid for heating and thus would be lighter and easier to transport since there is no need to worry about spilling liquids.

It should be appreciated that the heater described herein could be arranged and modified to fit a variety of heating applications. For example a heater according to the present invention could be used to heat an injury. Similarly, a heater according to the present invention could be used to make a hand-warmer or foot-warmer. Accordingly, the present invention is not necessarily limited to particular applications, and could be used in other manners and still fall within the scope of the present invention.

The foregoing description merely explains and illustrates the invention and the invention is not limited thereto. The appended claims set forth the scope of the invention. Those skilled in the art that have the disclosure before them will be able to make modifications without departing from the scope of the invention.

What is claimed is:

1. A portable heater comprising:
a housing having at least one opening and a reaction chamber; and,
a heater disposed in the housing;
wherein the portable heater is devoid of an oxygen forcing or pumping device; and
wherein upon an introduction of a controlled amount of unforced ambient oxygen to the reaction chamber through the opening, the heater reacts with the ambient oxygen to produce a controlled amount of heat, and upon consumption of the ambient oxygen the heater ceases reacting to produce heat until an additional amount of ambient oxygen is introduced into the reaction chamber.

2. The heater of claim 1 wherein the at least one opening is resealable.

3. The heater of claim 1 wherein there are two openings.

4. The heater of claim 1 further comprising an air-metering pump for providing the introduction of the oxygen.

5. The heater of claim 4 wherein the air-metering pump includes a spring.

6. The heater of claim 1 further comprising an object to be heated disposed in the housing adjacent the heater.

7. The heater of claim 6 wherein the object is a plurality of wipes arranged in a stack.

8. The heater of claim 7 wherein the housing includes a dispensing slot for removing a top wipe from the stack.

9. The heater of claim 8 further comprising a platform and a spring disposed in the housing such that a bottom wipe of the stack is adjacent the platform and the spring biases the platform towards the heater.

10. The heater of claim 1 further comprising a diffuser disposed between the at least one opening and the heater.

11. A portable heater comprising:
a housing having an air inlet, an air vent and a reaction chamber; and,
a heater disposed in the housing; and
wherein the portable heater is devoid of an oxygen forcing or pumping device; and
wherein upon an introduction of a controlled amount of unforced ambient of oxygen to the reaction chamber through the air inlet, the heater reacts with the ambient oxygen to produce a controlled amount of heat, and upon consumption of the ambient oxygen the heater ceases reacting to produce heat until an additional amount of ambient oxygen is introduced into the reaction chamber.

12. The heater of claim 11 wherein the oxygen is consumed in 30 to 60 seconds.

13. The heater of claim 11 further comprising an air metering pump.

14. The heater of claim 13 wherein the air metering pump forms part of the housing.

15. The heater of claim 14 wherein the air inlet and air vent are disposed on the air metering pump.

16. The heater of claim 15 wherein the air metering pump further comprises a spring.

17. The heater of claim 16 further comprising a diffuser disposed in the housing adjacent the heater.

18. The heater of claim 17 further comprising an object to be heated.

19. The heater of claim 18 wherein the object is a plurality of wipes arranged in a stack.

20. The heater of claim 19 wherein the housing includes a dispensing slot for removing a top wipe from the stack.

* * * * *

UNITED STATES PATENT AND TRADEMARK OFFICE
CERTIFICATE OF CORRECTION

PATENT NO.        : 9,004,059 B2
APPLICATION NO.   : 12/874338
DATED             : April 14, 2015
INVENTOR(S)       : Charles Edward Sesock and Lawrence A. Tinker Page 1 of 1

It is certified that error appears in the above-identified patent and that said Letters Patent is hereby corrected as shown below:

In the Claims

Line 14, Column 12, line 8 of Claim 11    After "unforced ambient" delete "of".

Signed and Sealed this
Twenty-second Day of September, 2015

Michelle K. Lee
*Director of the United States Patent and Trademark Office*